United States Patent [19]

Luce

[11] Patent Number: 4,685,744
[45] Date of Patent: Aug. 11, 1987

[54] VEHICLE AIR BRAKE SYSTEM WITH PRESSURE SEPARATING BRAKE HOUSING

[76] Inventor: Ronald W. Luce, 15910 Mesa Verde, Houston, Tex. 77059

[21] Appl. No.: 930,052

[22] Filed: Nov. 12, 1986

Related U.S. Application Data

[63] Continuation of Ser. No. 744,320, Jun. 13, 1985, abandoned.

[51] Int. Cl.$^4$ .............................................. B60T 17/16
[52] U.S. Cl. ................................... 303/89; 188/265; 303/2; 303/13; 303/84 A
[58] Field of Search .................... 303/89, 84 A, 84 R, 303/6 M, 9, 2, 3, 7, 15, 29, 40, 68, 63, 13, 71; 188/265

[56] References Cited

U.S. PATENT DOCUMENTS

| Re. 29,913 | 2/1979 | Case et al. | 303/89 |
| 1,213,363 | 1/1917 | Henry | 303/89 |
| 1,486,939 | 3/1924 | Winter | 303/13 |
| 2,240,166 | 4/1941 | Stanley | 303/84 A |
| 3,151,525 | 10/1964 | Dobrikin et al. | 303/89 |
| 3,497,267 | 2/1970 | Dobrikin | 303/3 |
| 3,507,542 | 4/1970 | Cannella | 303/15 |
| 3,721,474 | 3/1973 | Rogers | 303/13 |

OTHER PUBLICATIONS

"Kent's Mechanical Engineers' Handbook", *Design and Production Vol.*, 20th Ed. (New York: John Wiley & Sons, Inc., 1950), pp. 13-13 to 13-14.

Primary Examiner—John W. Caldwell, Sr.
Assistant Examiner—Alvin Oberley
Attorney, Agent, or Firm—Vaden, Eickenroht, Thompson & Boulware

[57] ABSTRACT

A two-way check valve is utilized with each brake assembly to apply pressure against a single actuating diaphragm. One inlet port is connected to the service air supply and one inlet port is connected to the emergency air supply. Satisfactory pressure of either supply operates the brake connected to the brake assembly in a service manner, the loss of air pressure in either supply causing that supply to be closed by the check valve. Emergency air venting from a spring-biased piston with a pawl end causes the pawl to engage a rack surface of the brake actuator rod. Hence, no spring is used to power the brake actuator rod and brake connected thereto closed when there is a loss service air pressure.

17 Claims, 5 Drawing Figures

VEHICLE AIR BRAKE SYSTEM WITH PRESSURE SEPARATING BRAKE HOUSING

This application is a continuation of application Ser. No. 744,320, filed June 13, 1985 abandoned.

BACKGROUND OF THE INVENTION

1. Field of the Invention

This invention pertains to a vehicle brake system employing two separate air pressure supplies and an improved brake assembly compatible therewith for connecting to the two supplies and utilizing the pressures supplied thereby under varying conditions of operation.

2. Description of the Prior Art

Parking, emergency and service air brake systems that are presently employed on trucks, trailers, truck tractors, busses and other air-brake equipped vehicles generally include dual diaphragm brake chambers for all non-steerable axles and single diaphragm brake chambers on all steerable axles. The pressure supply systems which are employed in such air brake systems generally comprise compressors and reservoirs along with multiple valves employed for the various operating modes of the brake system. There are generally two separate air systems employed, namely, a service or primary system, and an emergency or secondary system. Not only are the valves numerous, but they vary in complexity of construction. Variously such valves include service relay valves, spring brake control valves, quick release valves and others. Operationally, treadle valves are commonly used for service brake applications and pressure-regulated, push-pull valves are used for parking and emergency applications. Further, the power or pressure supply equipment utilize one-way and two-way check valves or other protection valves to protect one air system from another.

The purposes of having two air systems and the rather complex valving arrangements that operate therewith are many. One purpose is to provide safety in the event that there is a complete loss of air of one of the systems or at a connection between the tractor and the truck trailer of a motor truck vehicle. A further feature provided by such systems is to allow a driver to release and reapply brakes in the event of pressure loss in one side of the system. Therefore, it is apparent that safety and back-up operation are important in air brake systems. In fact, federal and state highway safety laws require that air systems meet certain requirements, including not only having a primary/secondary pressure operation, but also with regard to providing braking for emergency and parking operation in the event of complete loss of pressure.

The most prevalent systems employed in the prior art to meet this latter requirement utilizes a "spring brake," the operation of which is relatively simple. Such a spring brake operates in conjunction with a dual diaphragm brake chamber, namely, a service diaphragm brake chamber and an emergency diaphragm brake chamber. During normal driving operations the emergency diaphragm receives air pressure from the emergency reservoir keeping the brake spring compressed. This brake spring, when not compressed, operates in a direction to actuate the brakes. As the service brakes are applied, air is applied against the service diaphragm, causing the push or actuator rod of the brakes to advance and apply the brakes.

When there is a loss of air in the service system, the service brakes become inoperable and the spring is activated by exhausting air from the emergency diaphragm, thereby permitting the brakes to be applied by the mechanical force of the spring, which is also augmented in some cases by manual effort.

A common shortcoming of such a system is evident when there is a failure of the emergency air system. When there is a loss of emergency air pressure, the air applied against the emergency diaphragm will exhaust and the brakes will be applied by the spring automatically, even at highway speeds. Such result can be unexpected and even cause loss of control of the vehicle.

Another shortcoming of the prior art system just described is in conjunction with applying the brakes when parking. When the driver of the vehicle decides to stop and park the vehicle by applying the parking brake, the service air is unaffected. The emergency air against the emergency diaphragm is exhausted to allow the spring to move the actuator rod forward to apply the brakes. The same separation occurs when a trailer is disconnected from the tractor or other towing vehicle. That is, the air supply lines, and especially the emergency air supply line, is disconnected. This vents or exhausts the emergency diaphragm and causes the spring to set the brakes. Brakes are released by restoring the air pressure against the emergency diaphragm. If it is desired to release the brakes, there must be an air supply. Otherwise, the brakes can be manually released only by employing a special tool that requires considerable effort to operate and which exposes the user to safety hazards.

In further discussion of the shortcomings of prior art system, consider also the hazardous nature of the mechanism. The spring contained in the chamber must be extremely strong to brake a heavy vehicle. It can be under as much as 1800 pounds of force. Hence, it can literally explode from its housing should the housing corrode and weaken. Further, corrosion cannot be readily inspected. Moreover, should a mechanic remove the clamp ring retaining the spring without first taking the precaution of suitably externally restraining the housing parts, the spring will explode from the housing. Such an event has often caused injury and even death.

The chambers are large in size and are heavy. Because of their proximity to the axle, there is not much shock absorbing or cushioning of the chambers. Hence, they are subject to axle vibration, which can cause loss of air through the connections of the chamber or lines and valve parts connected thereto. As mentioned, high speed lockups will occur when there is a sudden emergency line pressure loss, such as with a line rupture.

Another disadvantage of the prior art air system described above is that it can cause severe and premature brake lining and brake drum wear. This wear results from brake drag caused by seal leaks between the emergency and service chambers. That is, when air restraining the spring leaks into the service chamber, this can cause the brakes to partially apply. Hence, drum and lining contact is made, resulting in reduced fuel economy, increased brake heat that reduces application forces and increased lining and drum wear.

Therefore, it is a feature of the present invention to provide an improved air brake system generally avoiding the safety and maintenance problems associated with conventional air brake systems employing spring brakes.

It is another feature of the present invention to provide an improved air brake assembly utilizing a single diaphragm with a mechanical locking device without using a brake-actuation spring.

It is yet another feature of the present invention to provide an improved air brake assembly utilizing a simplified two-way check valve in combination with a single diaphragm assembly in such a manner to avoid sudden brake applications but assuring brake applications in emergency and parking situation when the power supply lines are disconnected intentionally or unintentionally.

SUMMARY OF THE INVENTION

The preferred embodiment of the invention includes a brake assembly at each brake actuator rod which includes a single diaphragm chamber. The diaphragm drives the brake actuator rod forward to apply the brakes when a sufficient pressure is supplied to the air receiving inlet side of the chamber. Otherwise a return spring returns the actuator to release the brakes.

The input port to the chamber is connected to a two-way, open-center shuttle valve, one input to the valve being connected to the service or primary air supply and the other input to the valve being connected to the emergency or secondary air supply. If the supplies are of equal pressure, then the shuttle valve is centered and both supplies equally enter into pressurizing the diaphragm chamber. In the service application, the supply pressure is increased to more than the emergency side, thereby closing the emergency input side. If there is failure or loss of pressure on either side, but not both, the valve will shut off the low pressure side and operate normally with respect to the remaining pressurized side.

The feature of the brake assembly not requiring air pressure to actuate the brakes includes a rack and emergency piston having a pawl end which engages and holds the actuator in place when there is loss of supply pressure and the brakes have been actuated. Prior to such actuation, an adequate supply of emergency air pressure maintains the pawl end in its disengaged state. After the pawl end is engaged, then a resupply of pressure applied to the emergency side of the shuttle valve and to the piston will relieve the holding pressure between rack and pawl, while lifting the pawl from the rack.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a preferred embodiment of the invention and are therefore not to be considered limiting of its scope, for the invention may admit to other equally effective embodiments.

IN THE DRAWINGS

Figure 1:
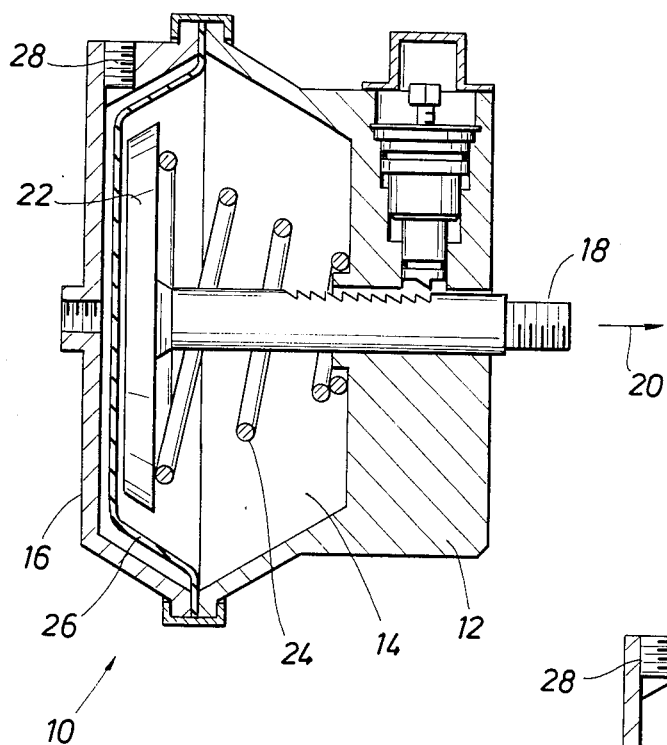

FIG. 1 is a cross-sectional side view of a preferred embodiment of a brake assembly in accordance with the present invention, with the diaphragm and brake actuator in the non-applied brake condition.

Figure 2:
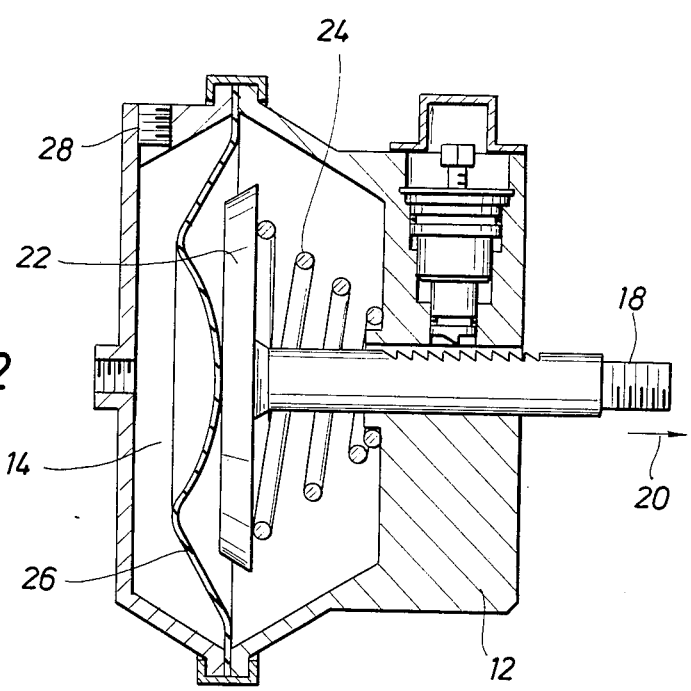

FIG. 2 is a cross-sectional side view of the embodiment shown in FIG. 1 with the parts shown in the service or emergency brake application condition.

Figure 3:
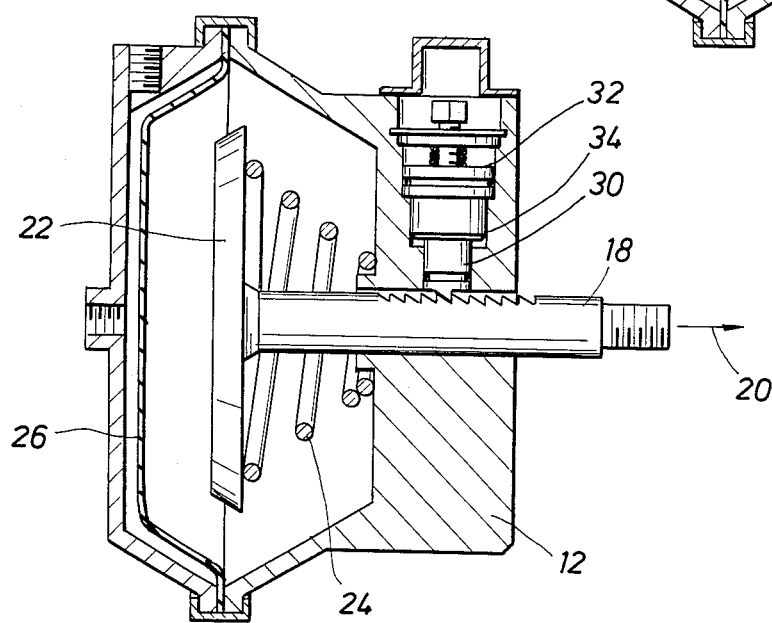

FIG. 3 is a cross-sectional side view of the embodiment shown in FIG. 1 with the parts shown in the parking application condition.

Figure 4:
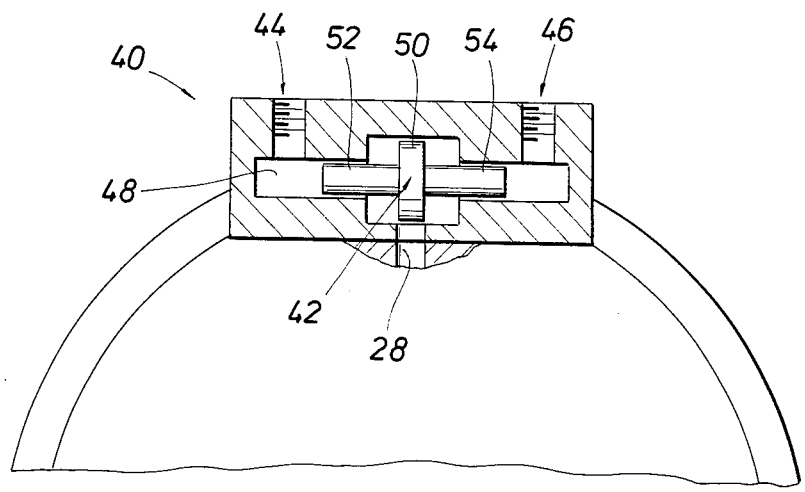

FIG. 4 is a cross-sectional view of a two-way check valve connected to a brake assembly in accordance with a preferred embodiment of the present invention.

Figure 5:
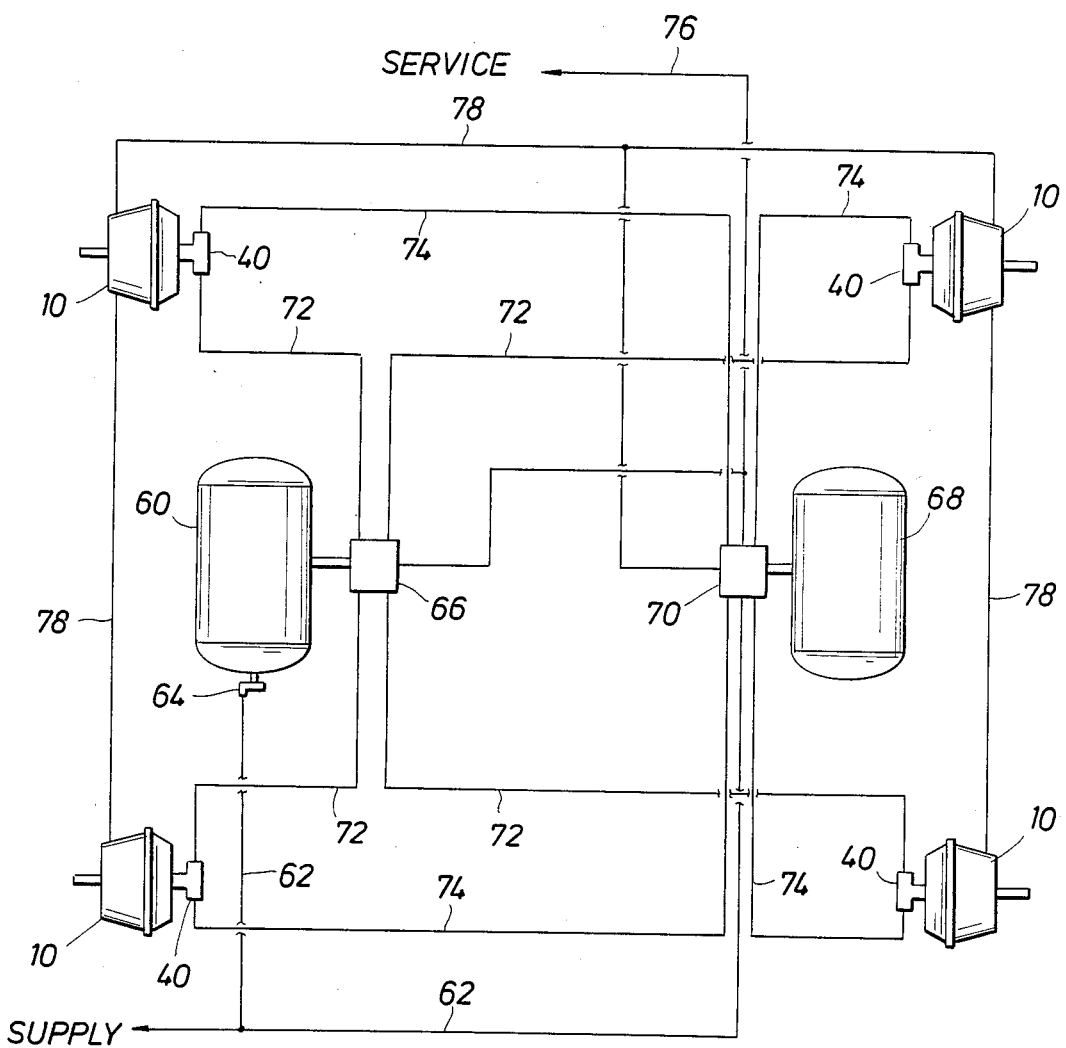

FIG. 5 is a diagram of a preferred fluid supply system in accordance with the present invention.

DESCRIPTION OF THE PREFERRED EMBODIMENT

Now referring to the drawings and first FIGS. 1-3, a brake assembly 10 in accordance to the present invention is respectively shown in cross-sectional views in three operating conditions. A housing 12 defines a chamber 14 in conjunction with a cover 16. An opening in housing 12 accommodates the axial movement of brake push or actuator rod 18. A movement in direction 20 to the right as shown in the drawing applies the brake which operates in conjunction with the actuator rod.

The portion of rod 18 which is contained within chamber 14 includes actuator rod plate 22. A return spring 24 located between plate 22 and housing 12 internally within chamber 14 biases actuator rod in the return or opposite direction from direction 20.

A single diaphragm 26 is held by the joining of cover 16 to housing 12 and divides chamber 14 into two sections, namely, the actuator section on the right in the drawing in which the actuator rod is located and the air section on the left in the drawing to which air is applied under pressure. An inlet opening for pressurized air is established through cover 16 at port 28 at the upper left portion of the drawing.

In FIG. 1 it is assumed that no service or emergency air is being applied at inlet port 28; therefore, diaphragm 26 is in its depressurized condition allowing actuator rod 18 to be at its full left or deactuated position, as shown.

FIG. 2 shows what happens to the parts upon application of service or emergency brake air pressure at inlet port 28. Note that air fills the left portion of chamber 14 to move the center portion of diaphragm 26 to the right. Such diaphragm movement causes the diaphragm to contact actuator rod 18, which causes the actuator rod to move to the right or direction 20, thereby applying the brake of the vehicle connected to the rod. At the same time, return spring 24 is compressed. Spring 24 is not a powerful spring but is only sufficiently strong to return the actuator rod to the left upon release of actuating air pressure from the left side of chamber 14.

FIG. 3 shows the condition of the brake assembly in the parking application condition. Prior to describing this condition, further parts of the drawing need to be identified. The upper portion of actuator rod 18 machined to form a rack having the vertical sides on the right side of each tooth depression in the ramp side of each tooth on the left, as shown in the drawing. Hence, when the pawl end of a piston is inserted at right angles to the rack, the pawl-and-rack action constrains actuator rod 18 from moving to the left but allows actuator rod to move in direction 20 to the right with the application of additional actuating force on the actuator rod.

Piston rod 30 operates within its piston housing and includes the conventional parts with O-rings and the like to permit easy operation in its piston housing. A bias spring 32 is also included for urging piston 30 in the downward direction. A port 34 in the piston chamber or housing below the large center portion of the piston is connected to an emergency air supply for acting in the opposing direction to the bias action of spring 32. That is, if the applied pressure to port 34 is above a predetermined level, the downward force of spring 32 is overcome and piston 30 will be held so that its pawl end is out of engagement with the rack previously described. If the applied pressure at port 34 is below that level, then the pawl end is pushed into engagement with the rack.

Now referring to FIG. 4, a cross-sectional view of a check valve 40 with an open-center shuttle valve mechanism 42 is illustrated. Air pressure from the valve is applied to port 28 of the brake assembly illustrated in FIGS. 1–3. Check valve 40 has two inputs, namely, ports 44 and 46, input port 44 being connected to the service air supply system of the overall air brake system and input port 46 being connected to the emergency or secondary air supply system. Shuttle valve mechanism 42 operates within valve chamber 48 and is free to move either to the left or to the right of the center position shown depending on the pressure differential appearing at the inlet ports. Center portion 50 of the shuttle mechanism is circumferentially larger than its end portions 52 and 54 on either side thereof. However, the internal dimension of chamber 48 in which center portion 50 operates is larger than the dimension of 48 to permit passage of air from either direction passing thereby and out port 28, although applying some side pressure to center portion 50 as it does so. Port 28 opens into internally the large portion of chamber 48, preferably at center position.

End portions 52 and 54 of the shuttle valve mechanism operates respectively within portions of chamber 48 which are just slightly larger than these end portions and hence air passage is permitted to pass by. When center portion 50 moves to its limit to the left in the drawing shown, however, the contact of the shuttle valve mechanism with the shoulders of the reduced portion of the chamber forms an effective seal with center portion 50 that prevents air flow from entering into the center portion of chamber 48 from inlet port 44. In similar fashion movement of center portion 50 of the shuttle mechanism seals off inlet port 46 when the valve mechanism is moved to its full righthand position.

In operation it will be seen that when the air pressure applied at inlet port 44 and inlet port 46 are the same, the shuttle valve mechanism assumes its center position. Hence, the pressure in chamber 48 will be equal to the two inlet pressures. This will also be the pressure delivered to outlet port 28.

However, if either inlet air pressure is greater than the other, the shuttle valve mechanism will move to seal off the low pressure side and only the high pressure will be presented to port 28.

Now turning to a typical air supply system for a vehicle operating in conjunction with four brake assemblies and shuttle valve mechanisms previously discussed, reference is made to FIG. 5. A service or primary supply reservoir 60 is shown receiving air from an air compressor (not shown) on line 62 into its input connection 64. Input connection 64 includes a pressure protection valve. This valve is set to prevent air pressure to build up in reservoir 60 until after it has built up to a preestablished high level pressure setting, normally 70 psi in reservoir 68. In addition, the valve also includes a one-way check valve that prevents any air to flow back in line 62 from the reservoir. The outlet of reservoir 60 is to relay valve 66 from which air is further distributed in a manner described more fully hereafter. Relay valve 66 can be of a Type R-12 relay valve manufactured by the Bendix Corporation Heavy Vehicle Systems Group, or equivalent. Typically, air applied to the service port of the valve from service line 76 forces a relay piston down against a biasing spring to open a supply port connected to reservoir 60 to permit flow through four delivery ports to lines 72. Varying the pressure on line 76 causes the opening of the supply and delivery ports to vary accordingly to regulate the amount of brake application.

Emergency or secondary air reservoir 68 is likewise connected to the air compressor via supply line 62. Input connection is made to the reservoir through an relay emergency valve system 70, also explained more fully hereafter. Relay emergency valve 70 can be a Type RE-6 relay emergency valve manufactured by the Bendix Corporation Heavy Vehicle Systems Group, or equivalent. It has several operating modes. The first is when it is receiving high pressure air from a supply source for pressurizing reservoir 68 and supplying air to the delivery ports connected to the respective brake chambers it is receiving such air through a one-way check valve, so that no air can escape from reservoir 68 if line 62 is ruptured. The actual pressure delivered to the brakes is controlled in the same manner as for relay valve 66 described above. During intial air up, after a predetermined high level pressure is supplied to the delivery ports at the reservoir, for example, 50 psi, these delivery ports are closed and the excess pressure is exhausted by an exhaust piston while reservoir pressure continues to increase. As long as the supply pressure is maintained above a predetermined low level supply pressure, for example, 45 psi, a spring is compressed and operation is in accordance with the above operating mode.

When the supply pressure decreases to under 45 psi, then the spring extends and opens air flow from reservoir 68 to the delivery ports for fully applying the brakes. At manual operating pressures, the service function is as stated for a relay valve. That is, operation is the same as with adequate supply air except it is with respect to air supplied from reservoir 68. At the same time, a one-way check valve prevents air in reservoir 68 from escaping through the supply line, thereby isolating air in reservoir 68 for emergency and parking applications.

The output from primary supply reservoir 60 shows for example, four brake assemblies 10, which are the same as the brake assemblies detailed in FIGS. 1–3, that are each connected through a two-way check valve connector 40 via lines 72. Two of these substantially identical brake assemblies are typically connected to a non-steerable axle. These connections are made to inlet port 44 of the respective connectors, as previously discussed in connection with the detailed description of FIG. 4.

In similar fashion each of the two-way check valves 40 is connected through relay emergency valve 70 to receive emergency air via lines 74. Lines 74 are connected to respective inlet ports 46 of the check valves.

Service line 76 is connected for application of pressure by the operator through a mechanism not shown, but which is typically a piston pump. Service line 76 is connected to both service valve 66 and emergency valve relay 70.

The parking capability which was described in connection with FIG. 3 is provided by lines 78 to the brake assemblies via relay emergency valve 70 connected to emergency reservoir 68 or connected directly to reservoir 68. Lines 78 connect to ports 34 leading to the piston chambers. This pressure is from the same source as the pressure carried in line 74 (namely, reservoir 68).

In operation, service pressure applied by the operator on line 76 causes relay valve 66 to connect lines 72 to receive actuation pressure from reservoir 60 and causes relay emergency valve 70 to connect lines 74 to receive actuation pressure from reservoir 68. Assuming that these pressure levels are the same, the shuttle mechanism of each of the check valves will assume its center position and the supply of pressure will cause the brake to actuate as previously described in connection with the description of FIG. 2. If the pressure of one of the systems is low or lost because there is a rupture or open connection, the brakes will still actuate in the desired manner because of the operation of the two-way check valve as discussed in conjunction with FIG. 4.

In order to set the emergency or parking brake, relay emergency valve 70 is operated by means not shown but separate from reservoir 60, relay valve 66 and lines 72. This is done by a control that effectively opens or shuts off supply pressure on line 62. The existence of the one-way check valve at connection 64 prevents air from reservoir 60 entering line 62 to delay the emergency braking application. The application of emergency or parking brakes in this manner causes the relay emergency valve 70 to be set so that pressure from reservoir 68 is supplied through lines 74 against diaphragm 26, as discussed above. Parking is provided by the system by the application of such air pressure so long as that pressure is in excess of that which is required to retain spring 32 in its compressed condition. When the pressure falls below a predetermined pressure level, the expansion force supplied by spring 32 causes the pawl end of piston 30 to engage the rack surface of actuator rod 18 and the brake holding then becomes mechanical. Subsequent removal of the remaining air pressure from the left side of diaphragm 26 does not affect the holding condition of the pawl and rack.

The control mentioned above on a typical air brake system employed on tractors and trucks for setting the emergency brakes employs a push-pull pressure regulated valve. When this valve is pulled, it interrupts the flow through the supply line and vents the line pressure to the atmosphere. The same valve is also designed to automatically disengage the supply line at a pre-set low pressure, usually 45 psi, to cause the relay emergency valve to automatically switch over to emergency operation for setting the brakes, as described above.

Any interruption in supply line pressure, no matter how much pressure is established in reservoir 68, will establish operation with respect to the emergency air supply. For example, if a trailer becomes disconnected at highway speeds, the application would be automatic at full tank pressure and there would be no loss of air because of the one-way check valve in relay emergency valve 70.

To release the parking brake mechanism, service and/or emergency air is applied to the left side of the respective brake assemblies, as previously discussed, thereby putting pressure on actuator rods 18 in the direction 20. This relieves the friction holding of the pawls and racks. At the same time emergency air is reestablished to ports 34 to move the piston rods upward which takes the pawls out of their rack contacts. Now the brake assemblies are released to operate in the previously discussed manner.

It will be seen that a two-way valve 40 connected to each of the brake assemblies allows a single diaphragm brake with a mechanical locking device to operate in a superior manner to the prior art assembly that included a powerful brake actuation spring, as discussed in the prior art section above. A loss of pressure on either side of the shuttle valve mechanism will close that side to prevent air loss from the other side. Such a two-way check valve offers a further safety advantage by balancing the air pressure during service brake application by allowing the shuttle to move in either direction so to absorb shock received when the brakes are applied such as when the vehicle is on a rough surface. Such movement reduces pressure from one chamber to another; however, because of the double pressuring of the brake assembly from both supplies there is no locking up of the brakes, as is a distinctive possibility with the prior art spring brake.

If there is a complete failure of the system, please note that the emergency air system can operate as the service system through the relay emergency valve 70 and the two-way check valves 40 at each of the brake assemblies.

A further advantage of the two-way check valve which has been discussed is that the valve allows pressure build up in a discharged air tank or reservoir by keeping the reservoir outlets closed until the air has been pressurized to operating conditions.

Spring 32 which operates in conjunction with piston 30 applies preferably a pressure of 40 to 60 psi in order to cause pawl engagement. It has been observed that this pressure application produces all of the needed force required to hold a vehicle fully loaded to it axle rating on a 20 degree grade. Note that this spring tension is much less than the actuation springs contained in conventional spring brakes which as previously discussed are under typically 1800 pounds of force.

Although numerous features have been shown and described, it will be understood that the invention is not limited to the particularly embodiment shown since many modifications may be made and will become apparent to those skilled in the art.

For example, a large vehicle will typically have more than two non-steerable axles and, hence, more than four brake assemblies.

Although not discussed above in connection with the above operation, a tractor protection valve exists on towing vehicles such as truck tractors that protects the tractor air system if a failure exists in line 62 or line 76. This valve closes when the tractor supply decreases to an unsafe level.

A truck trailer will also typically include disconnecting parts wherein the brakes are set and the cab or tractor portion is removed. In some cases the truck trailer will include an air system supply, but in many cases they will not. Therefore, to release the emergency brake, either an auxiliary air connection will have to be made or the assemblies will include an auxiliary means for releasing the piston pawls and, hence, the brakes. Mechanical means can also be included to reestablish the piston pawl and rack parking connection.

What is claimed is:

1. A vehicle brake assembly for operating a brake acuator rod, said brake assembly including
   a pressure housing with a first opening on one side thereof through which said actuator rod axially operates in a braking direction and a return direction opposite thereto,
   a diaphragm positioned for actuating said actuator rod in the braking direction,
   said pressure housing having a second opening on the side of said diaphragm opposite from said actuator rod for receiving pressure for actuating said diaphragm, and
   a two-way, open-center shuttle valve connected to said second opening having a first input port on one side of its center for receiving pressure from a service pressure supply and a second input port on the other side of its center for receiving pressure from an emergency pressure supply, a balance of service and emergency pressures keeping the shuttle of said open-center shuttle valve centered so that the common pressure of said service and emergency pressures provide actuating pressure against said diaphragm, an imbalance of said service and emergency pressures closing said two-way valve input port to the low pressure one of said imbalance service and emergency pressures while maintaining pressure from the high pressure one of said imbalance service and emergency pressures.

2. A vehicle brake assembly in accordance with claim 1, and including mechanical return means for biasing said actuator rod in the return direction.

3. A vehicle brake assembly in accordance with claim 2, wherein said mechanical return means includes a return spring for urging said actuator rod in the return direction.

4. A vehicle brake assembly in accordance with claim 1, and including an end plate affixed to the end of said actuator rod within said pressure housing, said diaphragm actuatingly contacting said end plate to operate said actuator rod in the braking direction.

5. A vehicle brake assembly in accordance with claim 1, and including auxiliary latching means for securing said actuator rod in place, comprising
   rack means affixed to said actuator rod providing teeth for holding engagement to prevent movement of said actuator rod in the return direction, and
   piston means having a piston rod end which enters into holding engagement with said rack means, said piston means further including bias means urging said piston rod into said holding engagement and a ported connection to apply emergency pressure for urging said piston rod out of said holding engagement, said piston rod entering into holding engagement when the applied emergency pressure drops below a predetermined drop out value.

6. A vehicle brake assembly in accordance with claim 5, wherein application of emergency pressure above a predetermined latch removal value higher than said drop out value through said second opening of said pressure housing operates said diaphragm to urge said actuator rod in the braking direction to automatically relieve holding engagement friction pressure and applies emergency pressure via said ported connection for moving said piston rod out of holding engagement.

7. A vehicle air brake system, comprising
   a service pressure supply of air,
   an emergency pressure supply of air, and
   at least one vehicle brake assembly for operating a brake actuator rod, said brake assembly including a pressure housing with a first opening on one side thereof through which said actuator rod axially operates in a braking direction and a return direction opposite thereto,
   a diaphragm positioned for actuating said actuator rod in the braking direction,
   said pressure housing having a second opening on the side of said diaphragm opposite from said actuator rod for receiving pressure for actuating said diaphragm,
   a two-way, open-center shuttle valve connected to said second opening having a first input port on one side of its center for receiving pressure from said emergency pressure supply, a balance of service and emergency pressures keeping the shuttle of said open-center shuttle valve centered so that the common pressure of said service and emergency pressures provide actuating pressure against said diaphragm, an imbalance of service and emergency pressures closing said two-way valve input port to the low pressure one of said imbalanced service and emergency pressures while maintaining pressure from said high pressure one of said imbalance service and said emergency pressures, and
   a signal supply of air including first valving means for metering service pressure supply to said first input port and second valving means for metering emergency pressure supply to said second input port.

8. A vehicle air brake system in accordance with claim 7, wherein said service pressure supply of air and said emergency pressure supply of air are pneumatic.

9. A vehicle air brake system in accordance with claim 7, and including mechanical return means for biasing said actuator rod in the return direction.

10. A vehicle air brake system in accordance with claim 9, wherein said mechanical return means includes a return spring for urging said actuator rod in the return direction.

11. A vehicle air brake system in accordance with claim 7, and including an end plate affixed to the end of said actuator rod within said pressure housing, said diaphragm actuatingly contacting said end plate to operate said actuator rod in the braking direction.

12. A vehicle air brake system in accordance with claim 7, and including auxiliary latching means for securing said actuator rod in place, comprising
   rack means affixed to said actuator rod providing teeth for holding engagement to prevent movement of said actuator rod in the return direction, and
   piston means having a piston rod end which enters into holding engagement with said rack means, said piston means further including bias means urging said piston rod into said holding engagement and a ported connection to apply pressure from said emergency pressure supply for urging said piston rod out of said holding engagement, said piston rod entering into holding engagement when the applied emergency pressure drops below a predetermined drop out value.

13. A vehicle air brake systems, in accordance with claim 12, wherein application of pressure from said emergency pressure supply above a predetermined latch removal value higher than said drop out value through said second opening of said pressure housing operates said diaphragm to urge said actuator rod in the braking direction to relieve holding engagement friction pressure and applies pressure from said emergency pressure supply via said ported connection for moving said piston rod out of holding engagement.

14. A vehicle air brake system in accordance with claim 7, wherein said vehicle brake assembly is attached to a brake on a non-steerable vehicle axle and including a second vehicle brake assembly substantially the same as said first-named vehicle brake assembly attached to a brake on a steerable vehicle axle of the vehicle.

15. A vehicle air brake system connectable to a supply pressure of air and to service pressure air, comprising
   a primary pressure reservoir having a check valve input connection for charging said primary pressure reservoir from the supply pressure of air,
   a delivery valve connected to the output of said primary reservoir for delivery of air at the pressure of said primary reservoir with the application of service pressure air to said delivery valve,
   a secondary pressure reservoir,
   a relay valve connected to said secondary reservoir having an input connection for charging said secondary reservoir from the supply pressure of air and an output connection at a pressure equal to the pressure of said secondary reservoir with the application of service pressure air to said relay valve, and
   a plurality of vehicle air brake assemblies, each operating a respective brake actuator rod, each of said brake assemblies including
   a pressure housing with a first opening on one side thereof through which said actuator rod axially operates in a braking direction and a return direction opposite thereto,
   a diaphragm positioned for actuating said actuator rod in the braking direction,
   said pressure housing having a second opening on the side of said diaphragm opposite from said actuator rod for receiving pressure for actuating said diaphragm, and
   a two-way, open-center shuttle valve connected to said second opening having a first input port on one side of its center for receiving pressure from said primary reservoir via said delivery valve and a second input port on the other side of its center for receiving pressure from said secondary reservoir via said second output connection of said relay valve for providing actuating pressure against said diaphragm, an imbalance of primary and secondary pressure closing said two-way valve input port to the low pressure one of said imbalanced primary and secondary pressures while maintaining pressure from the high pressure of one of said imbalanced primary and secondary pressures.

16. A vehicle air brake in accordance with claim 15, wherein
   each of said brake assemblies includes a mechanical latching means for securing said actuator rod in place when an applied pressure drops below a predetermined level,
   said relay includes a second output connection at a pressure equal to the pressure of said secondary reservoir, said second connection being connected as the applied pressure to said mechanical latching means, the normal operating pressure of said secondary reservoir being above said predetermined level to keep said mechanical latching means from securing said actuator rod,
   removal of pressure allowing diaphragm operation of said brake assembly until said applied pressure to said mechanical latching means falls below said predetermined level to cause securement of said actuator rod by said mechanical latching means.

17. A vehicle brake assembly for operating a brake actuator rod, said brake assembly including
   a pressure housing with a first opening on one side thereof through which said actuator rod axially operates in a braking direction and a return direction opposite thereto,
   a diaphragm positioned for actuating said actuator rod in the braking direction,
   said pressure housing having a second opening on the side of said diaphragm opposite form said actuator rod for receiving pressure for actuating said diaphragm, and
   a two-way, open-center shuttle valve connected to said second opening having a first input port on one side of its center for receiving pressure from a service pressure supply and a second input port on the other side of its center for receiving pressure from an emergency pressure supply, a balance of service and emergency pressure keeping the shuttle of said open-center shuttle valve centered so that the common pressure of said service and emergency pressures provide actuating pressure against said diaphragm, an imbalance of service and emergency pressures caused by road shock to the vehicle alternately partially closing said two-way valve input port to the alternate low pressure one of said imbalance service and emergency pressures while maintaining pressure from the alternate high pressure one of said imbalance service and ecergency pressures to thereby provide steady overall braking pressure to said diaphragm.

* * * * *